United States Patent
Han et al.

(10) Patent No.: US 11,265,792 B2
(45) Date of Patent: Mar. 1, 2022

(54) AERIAL VEHICLE STATE TRANSITION

(71) Applicant: Lenovo (Beijing) Limited, Beijing (CN)

(72) Inventors: Jing Han, Beijing (CN); Lianhai Wu, Beijing (CN); Haiming Wang, Beijing (CN)

(73) Assignee: Lenovo (Beijing) Co. LTD, Beijing (CN)

( * ) Notice: Subject to any disclaimer, the term of this patent is extended or adjusted under 35 U.S.C. 154(b) by 0 days.

(21) Appl. No.: 16/638,413

(22) PCT Filed: Aug. 11, 2017

(86) PCT No.: PCT/CN2017/097168
§ 371 (c)(1),
(2) Date: Feb. 11, 2020

(87) PCT Pub. No.: WO2019/028858
PCT Pub. Date: Feb. 14, 2019

(65) Prior Publication Data
US 2020/0245215 A1    Jul. 30, 2020

(51) Int. Cl.
*H04W 4/00* (2018.01)
*H04W 36/32* (2009.01)
(Continued)

(52) U.S. Cl.
CPC ........... *H04W 36/32* (2013.01); *H04W 36/14* (2013.01); *H04W 36/30* (2013.01)

(58) Field of Classification Search
CPC ..... H04W 36/32; H04W 36/14; H04W 36/30; H04W 36/0083; H04W 36/20;
(Continued)

(56) References Cited

U.S. PATENT DOCUMENTS 6,043,759 A * 3/2000 Paterson .............. G08G 5/0065
340/970
6,259,379 B1 * 7/2001 Paterson ................ G08G 5/045
340/970
(Continued)

FOREIGN PATENT DOCUMENTS

CN    101448340 A    6/2009
CN    105472096 A    4/2016
(Continued)

OTHER PUBLICATIONS

International Application No. PCT/CN2017/097168, "Notification of Transmittal of the International Search Report and the Written Opinion of the International Searching Authority", dated May 2, 2018, pp. 1-9.
(Continued)

*Primary Examiner* — Amancio Gonzalez
(74) *Attorney, Agent, or Firm* — Kunzler Bean & Adamson

(57) ABSTRACT

Apparatuses, methods, and systems are disclosed for aerial vehicle state transition configuration. One apparatus (200) includes a receiver (212) that receives (902) a state transition configuration corresponding to an aerial vehicle from a base unit. The apparatus (200) includes a transmitter (210) that transmits (904) a state transition report to the base unit based on the state transition configuration.

21 Claims, 9 Drawing Sheets

(51) Int. Cl.
*H04W 36/14* (2009.01)
*H04W 36/30* (2009.01)

(58) Field of Classification Search
CPC ....... H04W 24/02; H04W 8/22; H04W 36/08; H04W 88/02
See application file for complete search history.

(56) References Cited

U.S. PATENT DOCUMENTS

| | | | | |
|---|---|---|---|---|
| 8,892,265 | B2* | 11/2014 | Swearingen | B64D 41/007 700/287 |
| 9,207,758 | B2* | 12/2015 | Cernasov | G09B 9/307 |
| 9,207,954 | B2* | 12/2015 | Mood | G06F 9/44505 |
| 9,659,502 | B1* | 5/2017 | Abebe | G08G 5/0034 |
| 9,969,491 | B2* | 5/2018 | Strayer | B64C 39/024 |
| 10,001,843 | B2* | 6/2018 | Hygh | A63H 30/04 |
| 10,012,668 | B1* | 7/2018 | Naslund | G01P 13/025 |
| 10,210,765 | B2* | 2/2019 | Zajac | G06F 7/00 |
| 10,317,533 | B2* | 6/2019 | Cherepinsky | G01S 7/497 |
| 10,451,743 | B2* | 10/2019 | Adler | B64D 45/00 |
| 10,562,623 | B1* | 2/2020 | Sloan | B64C 25/10 |
| 10,804,989 | B2* | 10/2020 | Chen | H04W 48/20 |
| 2018/0273170 | A1* | 9/2018 | D'Sa | B64C 39/024 |
| 2018/0275654 | A1* | 9/2018 | Merz | G08G 5/0086 |
| 2018/0324581 | A1* | 11/2018 | Phuyal | H04W 36/30 |
| 2020/0133260 | A1* | 4/2020 | Chambers | G05D 1/0022 |

FOREIGN PATENT DOCUMENTS

| | | |
|---|---|---|
| WO | 2015030783 A1 | 3/2015 |
| WO | 2016124112 A1 | 8/2016 |

OTHER PUBLICATIONS

NTT Docomo Inc, Ericsson, "New SID on Enhanced Support for Aerial Vehicles", 3GPP TSG RAN Meeting #75 RP-170779, Mar. 6-9, 2017, pp. 1-4.

Ericsson, "Potential enhancements for HO", 3GPP TSG-RAN WG2 Meeting #98 R2-1705427, May 15-19, 2017, pp. 1-3.

Nokia, Alcatel-Lucent Shanghai Bell, "Potential mobility issues for air-borne UEs", 3GPP TSG-RAN WG2 Meeting #98 R2-1704321, May 15-19, 2017, pp. 1-4.

KDDI, "Proposal of potential LTE enhancements for Aerial Vehicles", 3GPP TSG-RAN2 Meeting #98 R2-1705999, May 15-19, 2017, pp. 1-5.

* cited by examiner

AERIAL VEHICLE STATE TRANSITION

FIELD

The subject matter disclosed herein relates generally to wireless communications and more particularly relates to aerial vehicle state transition.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Link Failure ("RLF"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, aerial vehicles may be used. In such networks, a configuration for an aerial vehicle may not be optimized for a state of the aerial vehicle.

BRIEF SUMMARY

Apparatuses for aerial vehicle state transition configuration are disclosed. Methods and systems also perform the functions of the apparatus. In one embodiment, the apparatus includes a receiver that receives a state transition configuration corresponding to an aerial vehicle. In certain embodiments, the apparatus includes a transmitter that transmits a state transition report based on the state transition configuration.

In one embodiment, the state transition configuration includes at least one state transition condition, and the at least one state transition condition includes a first trigger that initiates transition to a ground state and a second trigger that initiates transition to an airborne state. In a further embodiment, the at least one state transition condition includes an altitude of the aerial vehicle passing a threshold altitude, a serving cellular network reference signal received power passing a threshold serving cellular network reference signal received power, a neighboring cellular network reference signal received power passing a threshold neighboring cellular network reference signal received power, an average of neighboring cellular network reference signal received powers passing a threshold average reference signal received power, a number of neighboring cellular networks passing a threshold number of neighboring cellular networks, or some combination thereof.

In certain embodiments, the first trigger that initiates transition to the ground state is selected from the group including: an altitude of the aerial vehicle being less than a threshold altitude and a horizontal velocity of the aerial vehicle being less than a threshold horizontal velocity; a number of neighboring cellular networks having a reference signal received power greater than a threshold reference signal received power being less than a threshold number; and the altitude of the aerial vehicle being less than the threshold altitude and the number of neighboring cellular networks having a reference signal received power greater than the threshold reference signal received power being less than the threshold number.

In various embodiments, the second trigger that initiates transition to the airborne state is selected from the group including: an altitude of the aerial vehicle being greater than a threshold altitude and a horizontal velocity of the aerial vehicle being greater than a threshold horizontal velocity; a number of neighboring cellular networks having a reference signal received power greater than a threshold reference signal received power being greater than a threshold number; and the altitude of the aerial vehicle being greater than the threshold altitude and the number of neighboring cellular networks having a reference signal received power greater than the threshold reference signal received power being greater than the threshold number.

In some embodiments, the state transition configuration includes at least one conditional handover parameter, and the at least one conditional handover parameter includes a first set of parameters for a ground state and a second set of parameters for an airborne state. In one embodiment, the first set of parameters includes a neighboring cellular network having a reference signal received power better than a serving cellular network by a first offset, the second set of parameters includes the neighboring cellular network having a reference signal received power better than the serving cellular network by a second offset, or some combination thereof. In a further embodiment, the transmitter transmits a response indicating that the state transition configuration is accepted in response to the receiver receiving the state transition configuration. In certain embodiments, the apparatus includes a processor that determines whether one or more state transition conditions of the state transition configuration occur, wherein the transmitter transmits the state transmission report in response to the one or more state transition conditions occurring.

In various embodiments, the state transmission report includes a current state, a measured altitude, a reference signal received power of a serving cellular network, a reference signal received power of a strongest neighboring cellular network, an average reference signal received power of neighboring cellular networks, a measured number of neighboring cellular networks, a measured number of neighboring cellular networks having a reference signal received power greater than a threshold reference signal received power, or some combination thereof. In some embodiments, the receiver receives a state transition command based on the state transition report, and the transmitter transmits a report indicating completion of the state transition command. In a further embodiment, the receiver receives a radio resource control configuration based on the state transition report, and the radio resource control configuration includes a first handover command for a normal handover and/or a second handover command for a conditional handover.

In certain embodiments, the apparatus includes a processor, wherein: the receiver receives the first handover command based on a state of the aerial vehicle; in response to receiving the first handover command, the processor performs a handover procedure; and the processor initiates accessing a target base unit. In various embodiments, the apparatus includes a processor, wherein: the receiver receives the second handover command based on a state of the aerial vehicle, wherein the second handover command includes a trigger condition; in response to receiving the second handover command, the processor determines whether the trigger condition is triggered based on the state of the aerial vehicle; in response to the trigger condition being triggered, the processor performs a handover procedure; and the processor initiates accessing a target base unit. In some embodiments, the receiver receives a handover procedure in response to the transmitter transmitting the state transition report; in response to execution of the handover procedure failing, the transmitter transmits a radio link failure report including state information of the aerial vehicle; the receiver receives an indication indicating that a base unit received the radio link failure report; and the receiver receives a handover report from the base unit.

In some embodiments, the transmitter transmits a measurement report based on a measurement. In various embodiments, the apparatus includes a processor that performs the measurement using a measurement configuration. In such embodiments, the measurement configuration includes: prior to the expiration of a timer, completing the measurement upon detection of a cell meeting predetermined criteria; and upon expiration of the timer, measuring all detected cells. In certain embodiments, the apparatus includes a processor that performs the measurement using a measurement configuration. In such embodiments, the measurement configuration includes a maximum number of cells for which measurements are reported in the measurement report.

A method for aerial vehicle state transition configuration, in one embodiment, includes receiving a state transition configuration corresponding to an aerial vehicle. In various embodiments, the method includes transmitting a state transition report based on the state transition configuration.

In one embodiment, an apparatus for aerial vehicle state transition configuration includes a transmitter that transmits a state transition configuration corresponding to an aerial vehicle. In certain embodiments, the apparatus includes a receiver that receives a state transition report based on the state transition configuration.

In one embodiment, the state transition configuration includes at least one state transition condition, and the at least one state transition condition includes a first trigger that initiates transition to a ground state and a second trigger that initiates transition to an airborne state. In a further embodiment, the at least one state transition condition includes an altitude of the aerial vehicle passing a threshold altitude, a serving cellular network reference signal received power passing a threshold serving cellular network reference signal received power, a neighboring cellular network reference signal received power passing a threshold neighboring cellular network reference signal received power, an average of neighboring cellular network reference signal received powers passing a threshold average reference signal received power, a number of neighboring cellular networks passing a threshold number of neighboring cellular networks, or some combination thereof.

In certain embodiments, the first trigger that initiates transition to the ground state is selected from the group including: an altitude of the aerial vehicle being less than a threshold altitude and a horizontal velocity of the aerial vehicle being less than a threshold horizontal velocity; a number of neighboring cellular networks having a reference signal received power greater than a threshold reference signal received power being less than a threshold number; and the altitude of the aerial vehicle being less than the threshold altitude and the number of neighboring cellular networks having a reference signal received power greater than the threshold reference signal received power being less than the threshold number.

In various embodiments, the second trigger that initiates transition to the airborne state is selected from the group including: an altitude of the aerial vehicle being greater than a threshold altitude and a horizontal velocity of the aerial vehicle being greater than a threshold horizontal velocity; a number of neighboring cellular networks having a reference signal received power greater than a threshold reference signal received power being greater than a threshold number; and the altitude of the aerial vehicle being greater than the threshold altitude and the number of neighboring cellular networks having a reference signal received power greater than the threshold reference signal received power being greater than the threshold number.

In some embodiments, the state transition configuration includes at least one conditional handover parameter, and the at least one conditional handover parameter includes a first set of parameters for a ground state and a second set of parameters for an airborne state. In one embodiment, the first set of parameters includes a neighboring cellular network having a reference signal received power better than a serving cellular network by a first offset, the second set of parameters includes the neighboring cellular network having a reference signal received power better than the serving cellular network by a second offset, or some combination thereof. In a further embodiment, the receiver receives a response indicating that the state transition configuration is accepted in response to the transmitter transmitting the state transition configuration. In certain embodiments, the receiver receives the state transmission report in response to one or more state transition conditions occurring.

In various embodiments, the state transmission report includes a current state, a measured altitude, a reference signal received power of a serving cellular network, a reference signal received power of a strongest neighboring cellular network, an average reference signal received power of neighboring cellular networks, a measured number of neighboring cellular networks, a measured number of neighboring cellular networks having a reference signal received power greater than a threshold reference signal received power, or some combination thereof. In some embodiments, the transmitter transmits a state transition command based on the state transition report, and the receiver receives a report indicating completion of the state transition command. In a further embodiment, the transmitter transmits a radio resource control configuration based on the state transition report, and the radio resource control configuration includes a first handover command for a normal handover and/or a second handover command for a conditional handover.

In certain embodiments, the transmitter transmits the first handover command based on a state of the aerial vehicle. In various embodiments, the transmitter transmits the second handover command based on a state of the aerial vehicle, wherein the second handover command includes a trigger condition. In some embodiments, the transmitter transmits a handover procedure in response to the receiver receiving the state transition report; in response to execution of the handover procedure failing, the receiver receives a radio link failure report including state information of the aerial vehicle; the transmitter transmits an indication indicating receipt of the radio link failure report; and the transmitter transmits a handover report.

A method for aerial vehicle state transition configuration, in one embodiment, includes transmitting a state transition configuration corresponding to an aerial vehicle. In certain embodiments, the method includes receiving a state transition report based on the state transition configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
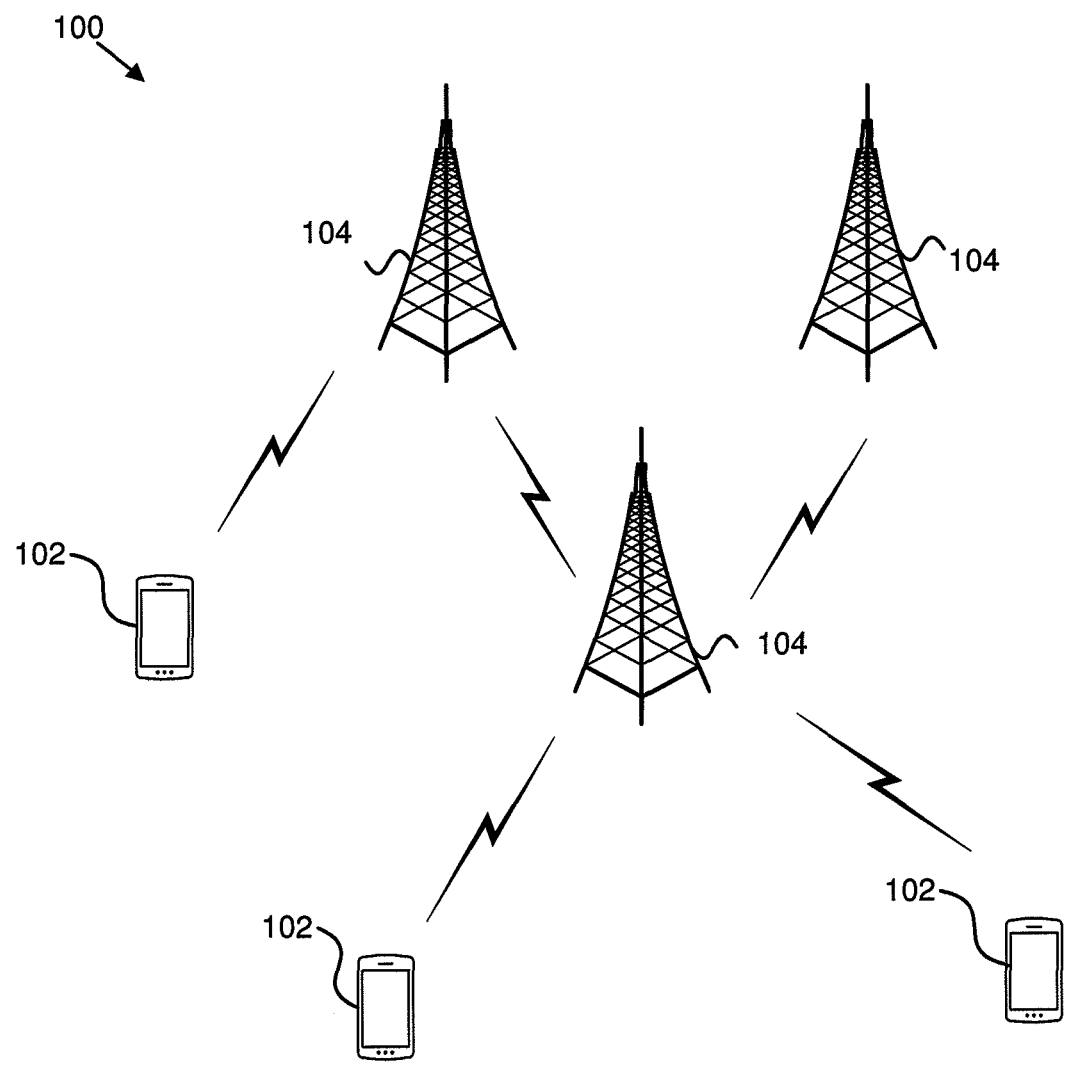
FIG. 1 is a schematic block diagram illustrating one embodiment of a wireless communication system for aerial vehicle state transition configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for aerial vehicle state transition configuration. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may receive a state transition configuration corresponding to an aerial vehicle (e.g., an aerial vehicle that the remote unit 102 is part of). In various embodiments, the remote unit 102 may transmit a state transition report based on the state transition configuration. Accordingly, a remote unit 102 may be configured to operate based on a state of an associated aerial vehicle (e.g., an aerial vehicle that the remote unit 102 is part of).

In one embodiment, a base unit 104 may transmit a state transition configuration corresponding to an aerial vehicle. In certain embodiments, the base unit 104 may receive a state transition report based on the state transition configuration. Accordingly, a base unit 104 may be used for configuring the aerial vehicle to operate based on a state that the aerial vehicle is in.

Figure 2:
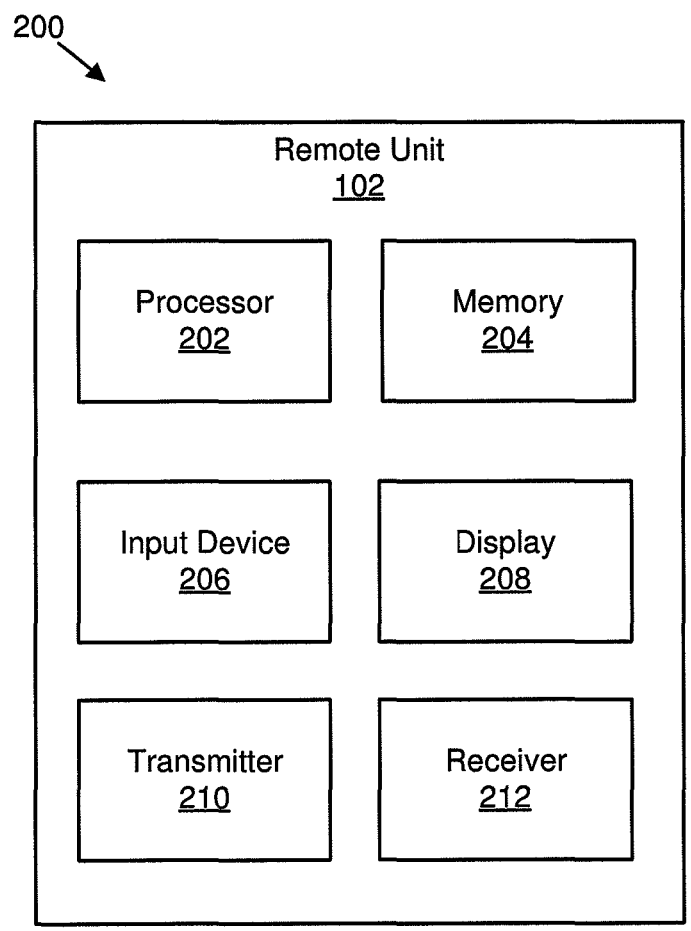
FIG. 2 is a schematic block diagram illustrating one embodiment of an apparatus that may be used for aerial vehicle state transition configuration.

FIG. 2 depicts one embodiment of an apparatus 200 that may be used for aerial vehicle state transition configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive (e.g., from a base unit 104) a state transition configuration corresponding to an aerial vehicle (e.g., an aerial vehicle that the remote unit 102 is a part of). In some embodiments, the transmitter 210 may be used to transmit a state transition report (e.g., to a base unit 104) based on the state transition configuration. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
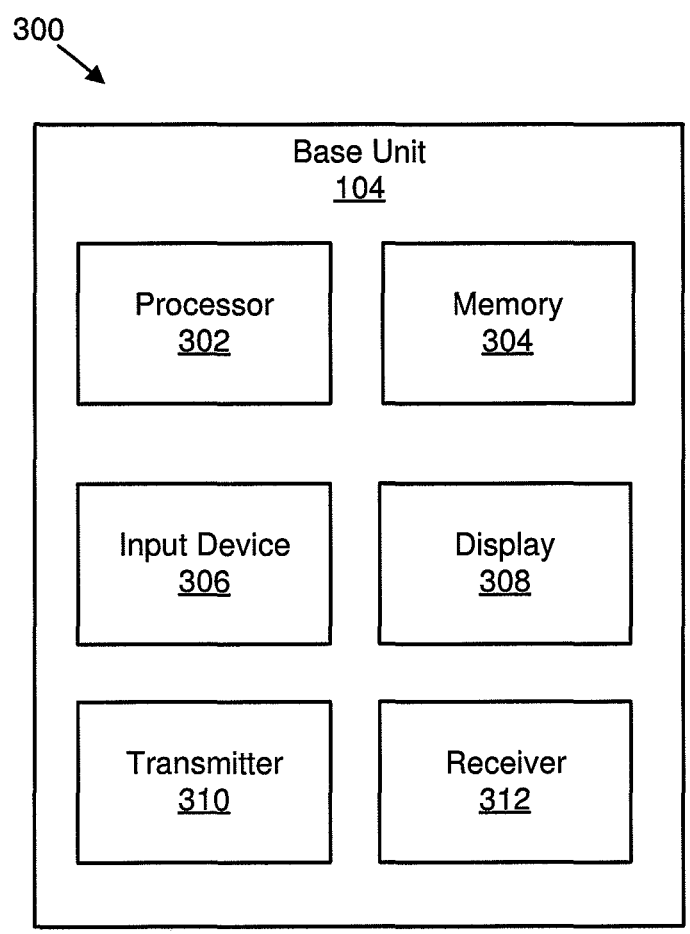
FIG. 3 is a schematic block diagram illustrating one embodiment of an apparatus that may be used for aerial vehicle state transition configuration.

FIG. 3 depicts one embodiment of an apparatus 300 that may be used for aerial vehicle state transition configuration. The apparatus 300 includes one embodiment of the base unit 104 and/or an aerial server. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may transmit a state transition configuration corresponding to an aerial vehicle. In some embodiments, the receiver 312 may receive a state transition report based on the state transition configuration. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
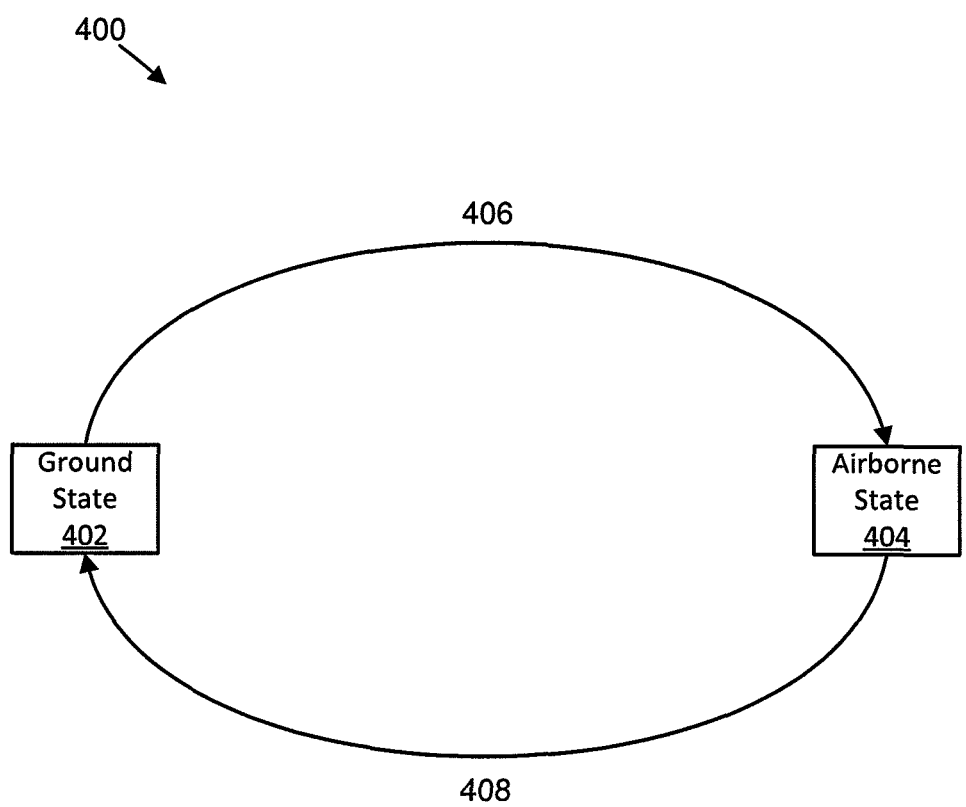
FIG. 4 is a schematic block diagram illustrating one embodiment of aerial vehicle states.

FIG. 4 is a schematic block diagram illustrating one embodiment of aerial vehicle states 400. The aerial vehicle states 400 include a ground state 402 and an airborne state 404. An aerial vehicle may transition 406 from the ground state 402 to the airborne state 404 in response to certain transition conditions occurring, and the aerial vehicle may transition 408 from the airborne state 404 to the ground state 402 in response to certain transition conditions occurring. Such transition conditions may be any suitable transition condition, such as passing a predetermined threshold altitude, passing a predetermined threshold velocity in a vertical direction, and so forth. The description corresponding to FIG. 5 describes some further examples of various transition conditions.

In certain embodiments, in the ground state 402 (e.g., on the ground, below a predetermined altitude, above the ground by less than a predetermined altitude, etc.), a remote unit 102 that is part of an aerial vehicle may operate with a configuration that is substantially the same as a configuration for a standard remote unit 102. In various embodiments, a base unit 104 may handle a remote unit 102 that is part of an aerial vehicle in substantially the same manner as a remote unit 102 that is not part of an aerial vehicle (e.g., use the same strategy for both types of remote units 102, use the same parameters for both types of remote units 102, use the same algorithms for both types of remote units 102, etc.).

In some embodiments, in the airborne state 404 (e.g., above the ground, above a predetermined altitude, above the ground by greater than a predetermined altitude, etc.), a remote unit 102 that is part of an aerial vehicle may operate with a configuration that is different from a configuration for a standard remote unit 102 and different from a configuration for a remote unit 102 that is part of an aerial vehicle that is in the ground state 402. In such embodiments, the remote unit 102 may operate with a different configuration to reduce interference that results from being in the airborne state 404.

Figure 5:
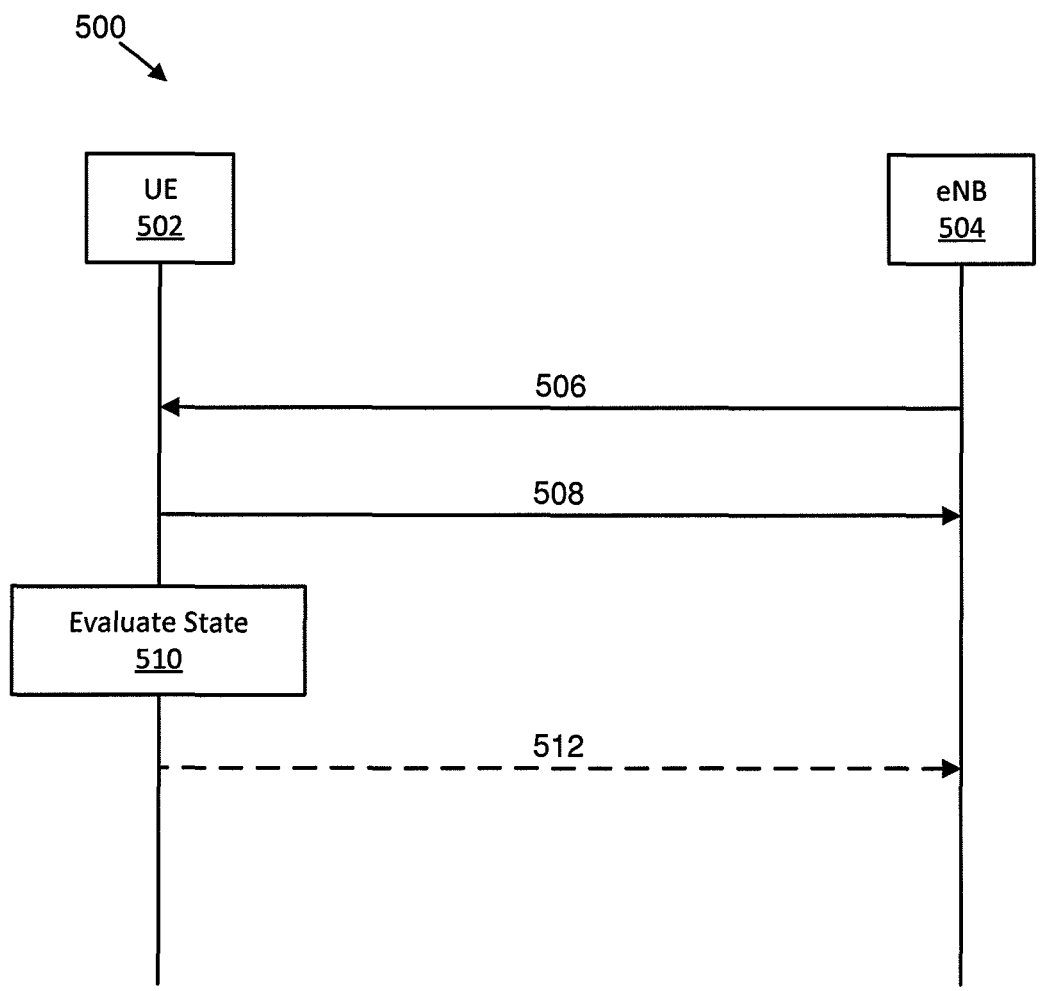
FIG. 5 is a schematic block diagram illustrating one embodiment of communications to facilitate aerial vehicle state transition.

FIG. 5 is a schematic block diagram illustrating one embodiment of communications 500 to facilitate aerial vehicle state transition. The communications 500 illustrated are between a UE 502 (e.g., a remote unit 102 that is part of an aerial vehicle) and an eNB 504.

In certain embodiments, in a first communication 506 the eNB 504 transmits one or more messages to the UE 502. For example, in one embodiment, as part of the first communication 506, the eNB 504 transmits configuration related information (e.g., a state transition configuration) to the UE 502 that indicates state transition conditions. The state transition conditions may include any suitable conditions that indicate a switch for the UE 502 from a ground state to an airborne state or from the airborne state to the ground state. In various embodiments, transition conditions (e.g., trigger conditions) may include: an altitude above the ground that passes a predetermined threshold; a serving cellular network RSRP (e.g., RSRP from a serving base unit 104) passing a predetermined threshold; a measured strongest neighboring cellular network (e.g., a strongest RSRP from a non-serving base unit 104) RSRP that passes a predetermined threshold; an average of measured RSRP of neighboring cellular networks that passes a predetermined threshold; a number of measured neighboring cellular networks that passes a predetermined threshold; and/or a number of measured neighbor cellular networks having an RSRP larger than a predetermined RSRP threshold passing a predetermined threshold.

In certain transition conditions, passing from lower than the predetermined threshold to higher than the predetermined threshold may indicate a transition condition from the ground state to the airborne state and passing from higher than the predetermined threshold to lower than the predetermined threshold may indicate a transition condition from the airborne state to the ground state. In other transition conditions, passing from lower than the predetermined threshold to higher than the predetermined threshold may indicate a transition condition from the airborne state to the ground state and passing from higher than the predetermined threshold to lower than the predetermined threshold may indicate a transition condition from the ground state to the airborne state.

In various embodiments, the following examples may indicate a combination of transition conditions for transitioning from the airborne state to the ground state: a height above the ground (e.g., altitude above the ground) being less than a threshold height (e.g., threshold altitude) and a horizontal velocity (e.g., horizontal speed) being less than a threshold horizontal velocity (e.g., threshold horizontal speed); a number of neighboring cellular networks having an RSRP greater than a threshold RSRP being less than a threshold number; and the height above the ground being less than the threshold height and the number of neighboring cellular networks having an RSRP greater than the threshold RSRP being less than the threshold number.

In certain embodiments, the following examples may indicate a combination of transition conditions for transitioning from the ground state to the airborne state: a height above the ground (e.g., altitude above the ground) being greater than a threshold height (e.g., threshold altitude) and a horizontal velocity (e.g., horizontal speed) being greater than a threshold horizontal velocity (e.g., threshold horizontal speed); a number of neighboring cellular networks having an RSRP greater than a threshold RSRP being greater than a threshold number; and the height above the ground being greater than the threshold height and the number of neighboring cellular networks having an RSRP greater than the threshold RSRP being greater than the threshold number.

In one embodiment, an indication of a state transition condition may trigger the UE 502 to transmit a state transition report and/or an indication that the state of the UE 502 is changed. In certain embodiments, the first communication 506 may include conditional handover parameters for the UE 502. In one embodiment, the conditional handover parameters may include handover parameters for the UE 502 in the ground state and handover parameters for the UE 502 in the airborne state. In certain embodiments, handover parameters for the UE 502 in the ground state may include that a neighboring cellular network has a RSRP better than a serving cellular network by a first offset. In various embodiments, handover parameters for the UE 502 in the airborne state may include that a neighboring cellular network has a RSRP better than a serving cellular network by a second offset different from the first offset.

In certain embodiments, in a second communication 508 the UE 502 transmits one or more messages to the eNB 504 in response to receiving the configuration related information. For example, in one embodiment, as part of the second communication 508, the UE 502 transmits an indication to the eNB 504 that indicates that the UE 502 is configured based on the configuration related information.

In certain embodiments, the UE 502 evaluates 510 its state based on the configuration related information (e.g., including trigger conditions for a state transition) to determine whether the UE 502 state has changed. For example, in one embodiment, the UE 502 may evaluate its current state and determine based on trigger conditions occurring that the UE 502 has transitioned from the ground state to the airborne state. As another example, in one embodiment, the UE 502 may evaluate its current state and determine based on trigger conditions occurring that the UE 502 has transitioned from the airborne state to the ground state. As a further example, in one embodiment, the UE 502 may evaluate its current state and determined that no trigger conditions have occurred and that the UE 502 state is unchanged.

In certain embodiments, in a third (optional) communication 512 the UE 502 transmits one or more messages to the eNB 504. For example, in one embodiment, as part of the third communication 512, the UE 502 transmits a state transition report to the eNB 504 based on the configuration related information (e.g., the state transition configuration). In some embodiments, in response to a state transition condition of a state transition configuration being fulfilled, the UE 502 may transmit a state transition report to the eNB 504. In various embodiments, the state transition report may include: a current state; a state to switch to; a state to switch from; a measured height above the ground; a measured altitude above the ground; a RSRP of a serving cellular network; a RSRP of a strongest neighboring cellular network; a RSRP of a neighboring cellular network; an average RSRP of neighboring cellular networks; a measured number of neighboring cellular networks; and/or a measured number of neighboring cellular networks having a RSRP greater than a threshold RSRP.

In certain embodiments, the eNB 504 transmits a state transition command to the UE 502 to initiate transition from one state to another. In such embodiments, the UE 502 may transmit feedback to the eNB 504 to indicate that the state transition command is complete. The state transition command, in some embodiments, may be a command that indicates for the UE 502 to transition a configuration from a ground state configuration to an airborne state configuration. In one embodiment, the state transition command may be a command that indicates for the UE 502 to transition a configuration from an airborne state configuration to a ground state configuration.

In various embodiments, the UE 502 may report measurement results to the eNB 504, such as in response to the UE 502 being located at an edge of a serving cellular network. In certain embodiments, when performing measurements, the UE 502 may be configured with a specific time-to-trigger ("TTT") value for an airborne state that is different from a UE that is not part of an aerial vehicle or different from a ground state. For example, a parameter of TimeToTrigger-Airborne may be configured to be used by an airborne UE during measurement, and when the UE 502 detects a first cell that can fulfill the measurement event, TimeToTrigger-Airborne may be triggered. After TimeToTrigger-Airborne expires, all detected cell results may be reported. Such parameter may be scaled by a scaling factor (e.g., SF-airborne, and for an airborne UE, it may use TimeToTrigger-Airborne multiplied by SF-airborne instead of TimeToTrigger-Airborne on its own).

In various embodiments, when performing measurements, the UE 502 may be configured with a specific maxReportCells for an airborne state that is different from a UE that is not part of an aerial vehicle or different from a ground state. For example, a parameter of maxReportCells-Airborne may be configured to be used by an airborne UE during measurement, such parameter may have a large value as compared to existing maxReportCells. For example, 16, 24, 32, 48, etc. values may be set for maxReportCells-Airborne. In a measurement report, the UE 502 may report up to maxReportCells-Airborne cells to the eNB 504. Such parameter may be scaled by a scaling factor (e.g., SF-airborne, and for an airborne UE, it may use maxReportCells-Airborne multiplied by SF-airborne instead of maxReportCells-Airborne on its own). In some embodiments, TimeToTrigger-Airborne and/or maxReportCells-Airborne may be used.

In some embodiments, based on measurement results, the eNB 504 may transmit an RRC reconfiguration to the UE 502. In one embodiment, the RRC reconfiguration may include mobility information (e.g., handover information). For example, the RRC reconfiguration information may indicate a normal handover or a conditional handover. For a normal handover, the eNB 504 may transmit a normal handover command based on a current UE state. In response to the UE 502 receiving the normal handover command, the UE 502 may perform a handover procedure and access a target eNB. For a conditional handover, the eNB 504 may transmit a conditional handover command including a trigger condition for handover based on a current UE state. In response to the UE 502 receiving the conditional handover command, the UE 502 may evaluate the trigger condition according to the current UE state. In response to the handover condition being fulfilled, the UE 502 may perform the conditional handover procedure and access a target eNB.

In certain embodiments, in response to the UE 502 performing a handover procedure, a handover failure may occur. In such embodiments, an eNB may transmit a RLF message having a RLF indication as described in FIGS. 6 through 8.

Figure 6:
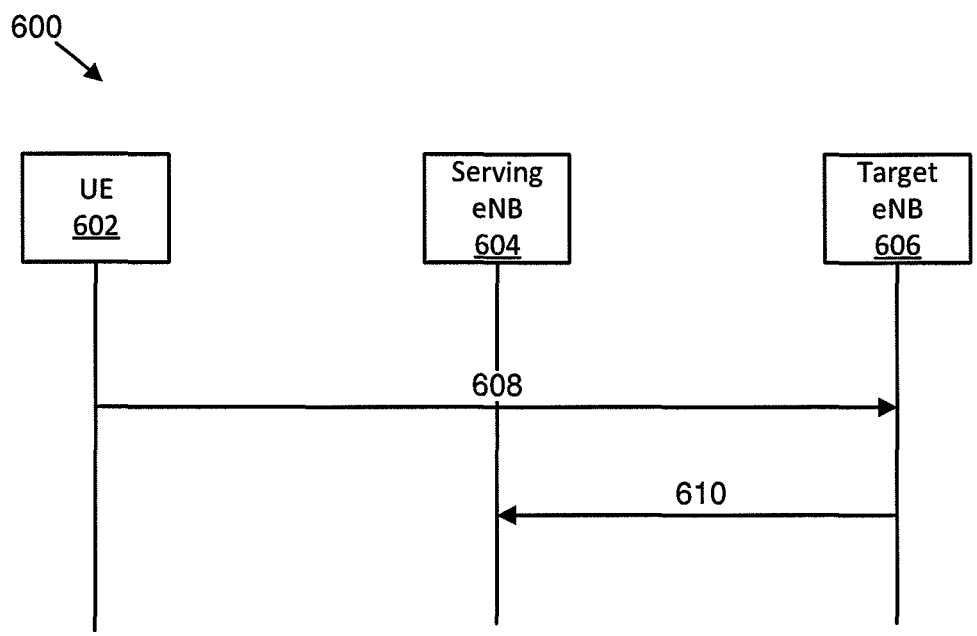
FIG. 6 is a schematic block diagram illustrating one embodiment of communications in response to a handover failure.

FIG. 6 is a schematic block diagram illustrating one embodiment of communications 600 in response to a handover failure (e.g., a handover that was too late). The communications 600 between a UE 602, a serving eNB 604, and a target eNB 606 are illustrated. The communications 600 include a first communication 608 transmitted from the UE 602 to the target eNB 606. In certain embodiments, the first communication 608 may include reestablishment information with a RLF report. Furthermore, the RLF report may include information about a state of the UE 602 (e.g., whether the UE 602 is in the ground state, whether the UE 602 is in the airborne state, etc.).

In various embodiments, the communications 600 include a second communication 610 transmitted from the target eNB 606 to the serving eNB 604. In some embodiments, the second communication 610 may include a RLF indication with the state of the UE 602.

Figure 7:
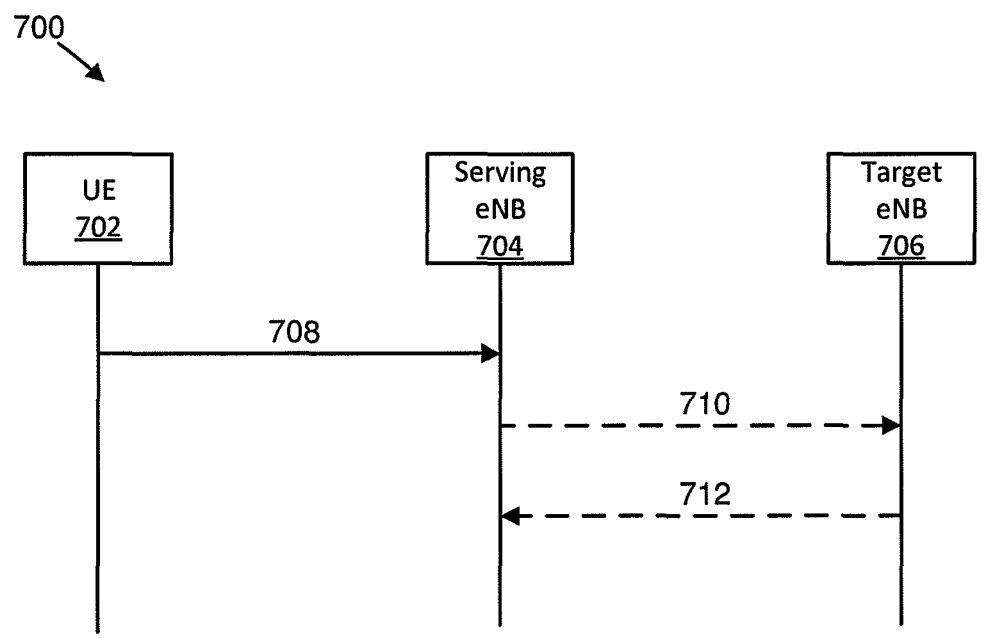
FIG. 7 is a schematic block diagram illustrating another embodiment of communications in response to a handover failure.

FIG. 7 is a schematic block diagram illustrating another embodiment of communications 700 in response to a handover failure (e.g., a handover that was too early). The communications 700 between a UE 702, a serving eNB 704, and a target eNB 706 are illustrated. The communications 700 include a first communication 708 transmitted from the UE 702 to the serving eNB 704. In certain embodiments, the first communication 708 may include reestablishment information with a RLF report. Furthermore, the RLF report may include information about a state of the UE 602 (e.g., whether the UE 602 is in the ground state, whether the UE 602 is in the airborne state, etc.).

In various embodiments, the communications 700 include a second communication 710 transmitted from the serving eNB 704 to the target eNB 706. In some embodiments, the second communication 710 may include a RLF indication with the state of the UE 702.

In some embodiments, the communications 700 include a third communication 712 transmitted from the target eNB 706 to the serving eNB 704. In certain embodiments, the third communication 712 may include a handover report with the state of the UE 702.

Figure 8:
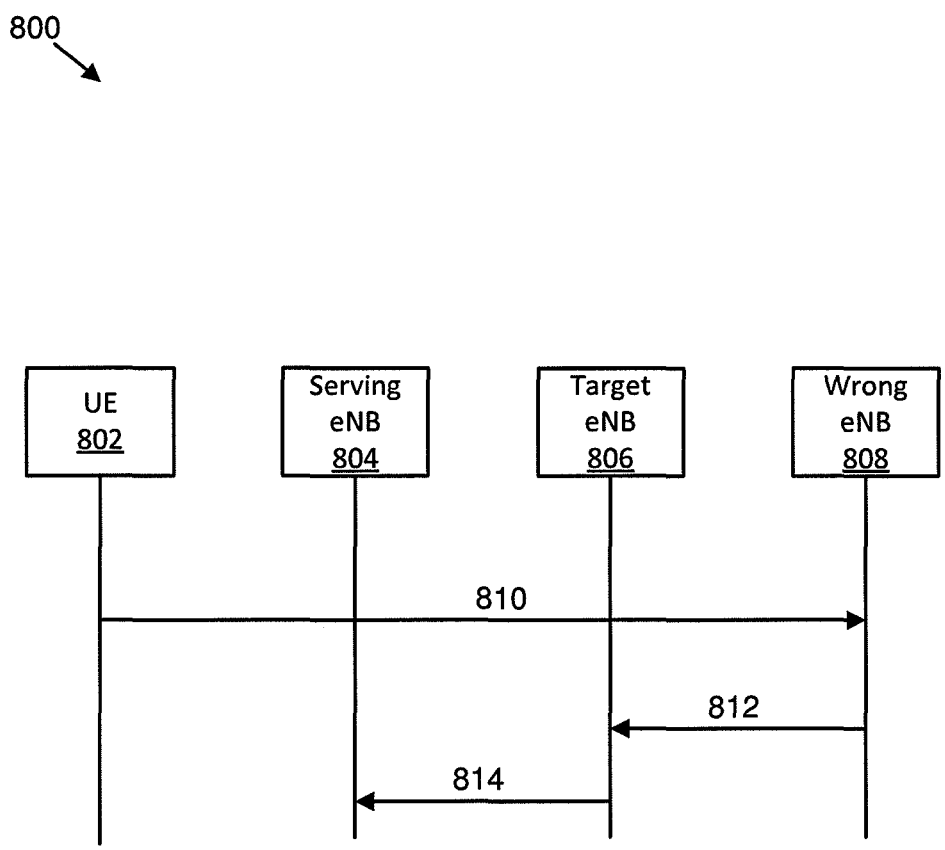
FIG. 8 is a schematic block diagram illustrating a further embodiment of communications in response to a handover failure.

FIG. 8 is a schematic block diagram illustrating a further embodiment of communications 800 in response to a handover failure (a handover that was to a wrong cell). The communications 800 between a UE 802, a serving eNB 804, a target eNB 806, and a wrong eNB 808 are illustrated. The communications 800 include a first communication 810 transmitted from the UE 802 to the wrong eNB 808. In certain embodiments, the first communication 810 may include reestablishment information with a RLF report. Furthermore, the RLF report may include information about a state of the UE 602 (e.g., whether the UE 602 is in the ground state, whether the UE 602 is in the airborne state, etc.).

In various embodiments, the communications 800 include a second communication 812 transmitted from the wrong eNB 808 to the target eNB 806. In some embodiments, the second communication 812 may include a RFL indication with the state of the UE 802.

In some embodiments, the communications 800 include a third communication 814 transmitted from the target eNB 806 to the serving eNB 804. In certain embodiments, the third communication 814 may include a handover report with the state of the UE 802.

Figure 9:
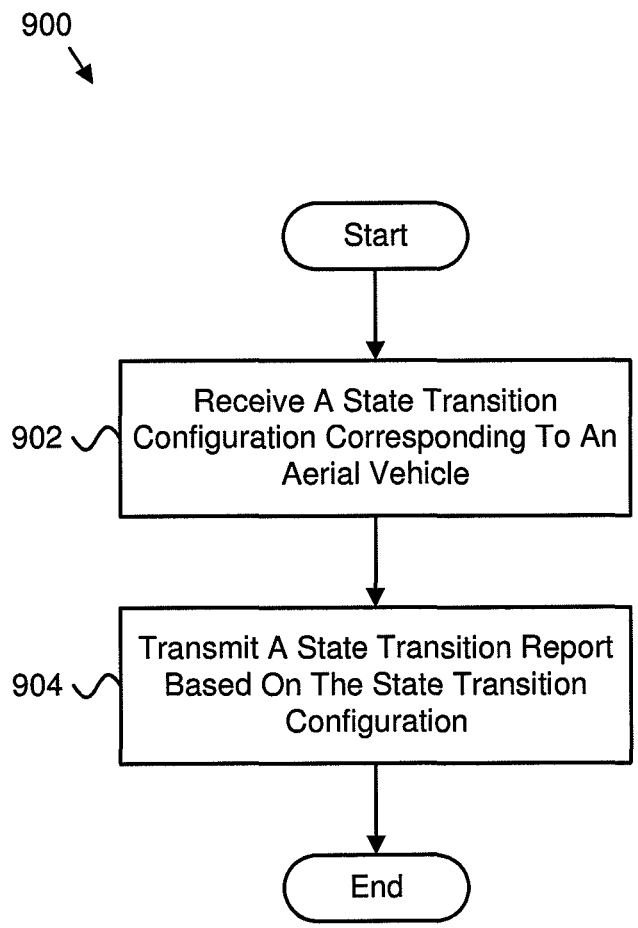
FIG. 9 is a schematic flow chart diagram illustrating one embodiment of a method for aerial vehicle state transition configuration.

FIG. 9 is a schematic flow chart diagram illustrating one embodiment of a method 900 for aerial vehicle state transition configuration. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a state transition configuration corresponding to an aerial vehicle (e.g., an aerial vehicle that the remote unit 102 is part of). In various embodiments, the method 900 includes transmitting 904 a state transition report based on the state transition configuration.

In one embodiment, the state transition configuration includes at least one state transition condition, and the at least one state transition condition includes a first trigger that initiates transition to a ground state and a second trigger that initiates transition to an airborne state. In a further embodiment, the at least one state transition condition includes an altitude of the aerial vehicle passing a threshold altitude, a serving cellular network reference signal received power passing a threshold serving cellular network reference signal received power, a neighboring cellular network reference signal received power passing a threshold neighboring cellular network reference signal received power, an average of neighboring cellular network reference signal received powers passing a threshold average reference signal received power, a number of neighboring cellular networks passing a threshold number of neighboring cellular networks, or some combination thereof.

In certain embodiments, the first trigger that initiates transition to the ground state is selected from the group including: an altitude of the aerial vehicle being less than a threshold altitude and a horizontal velocity of the aerial vehicle being less than a threshold horizontal velocity; a number of neighboring cellular networks having a reference signal received power greater than a threshold reference signal received power being less than a threshold number; and the altitude of the aerial vehicle being less than the threshold altitude and the number of neighboring cellular networks having a reference signal received power greater than the threshold reference signal received power being less than the threshold number.

In various embodiments, the second trigger that initiates transition to the airborne state is selected from the group including: an altitude of the aerial vehicle being greater than a threshold altitude and a horizontal velocity of the aerial vehicle being greater than a threshold horizontal velocity; a number of neighboring cellular networks having a reference signal received power greater than a threshold reference signal received power being greater than a threshold number; and the altitude of the aerial vehicle being greater than the threshold altitude and the number of neighboring cellular networks having a reference signal received power greater than the threshold reference signal received power being greater than the threshold number.

In some embodiments, the state transition configuration includes at least one conditional handover parameter, and the at least one conditional handover parameter includes a first set of parameters for a ground state and a second set of parameters for an airborne state. In one embodiment, the first set of parameters includes a neighboring cellular network having a reference signal received power better than a serving cellular network by a first offset, the second set of parameters includes the neighboring cellular network having a reference signal received power better than the serving cellular network by a second offset, or some combination thereof. In a further embodiment, the method 900 includes transmitting a response indicating that the state transition configuration is accepted in response to receiving the state transition configuration. In certain embodiments, the method 900 includes determining whether one or more state transition conditions of the state transition configuration occur, and transmitting the state transmission report in response to the one or more state transition conditions occurring.

In various embodiments, the state transmission report includes a current state, a measured altitude, a reference signal received power of a serving cellular network, a reference signal received power of a strongest neighboring cellular network, an average reference signal received power of neighboring cellular networks, a measured number of neighboring cellular networks, a measured number of neighboring cellular networks having a reference signal received power greater than a threshold reference signal received power, or some combination thereof. In some embodiments, the method 900 includes receiving a state transition command based on the state transition report, and transmitting a report indicating completion of the state transition command. In a further embodiment, the method 900 includes receiving a radio resource control configuration based on the state transition report, and the radio resource control configuration includes a first handover command for a normal handover and/or a second handover command for a conditional handover.

In certain embodiments, the method 900 includes: receiving the first handover command based on a state of the aerial vehicle; in response to receiving the first handover command, performing a handover procedure; and accessing a target base unit 104. In various embodiments, the method 900 includes: receiving the second handover command based on a state of the aerial vehicle, wherein the second handover command includes a trigger condition; in response to receiving the second handover command, determining whether the trigger condition is triggered based on the state of the aerial vehicle; in response to the trigger condition being triggered, performing a handover procedure; and accessing a target base unit 104. In some embodiments, the method 900 includes: receiving a handover procedure in response to transmitting the state transition report; in response to execution of the handover procedure failing, transmitting a radio link failure report including state information of the aerial vehicle; receiving an indication indicating that a base unit 104 received the radio link failure report; and receiving a handover report from the base unit 104.

In some embodiments, the method 900 includes transmitting a measurement report based on a measurement. In various embodiments, the method 900 includes performing the measurement using a measurement configuration. In such embodiments, the measurement configuration includes: prior to the expiration of a timer, completing the measurement upon detection of a cell meeting predetermined criteria; and upon expiration of the timer, measuring all detected cells. In certain embodiments, the method 900 includes performing the measurement using a measurement configuration. In such embodiments, the measurement configuration includes a maximum number of cells for which measurements are reported in the measurement report.

Figure 10:
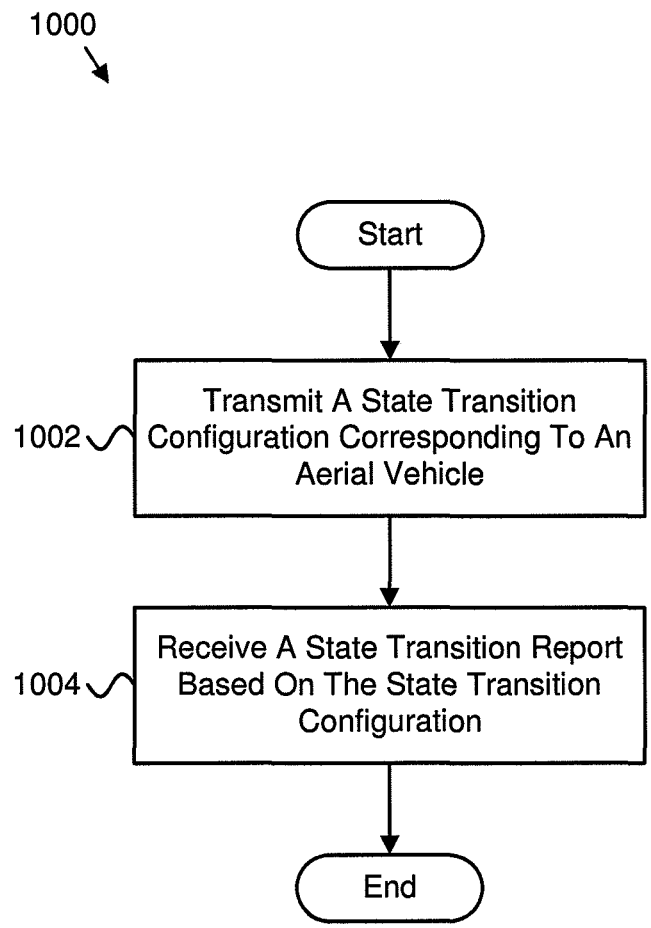
FIG. 10 is a schematic flow chart diagram illustrating another embodiment of a method for aerial vehicle state transition configuration.

FIG. 10 is a schematic flow chart diagram illustrating another embodiment of a method 1000 for aerial vehicle state transition configuration. In some embodiments, the method 1000 is performed by an apparatus, such as the base unit 104. In certain embodiments, the method 1000 may be performed by a processor executing program code, for example, a microcontroller, a microprocessor, a CPU, a GPU, an auxiliary processing unit, a FPGA, or the like.

The method 1000 may include transmitting 1002 a state transition configuration corresponding to an aerial vehicle. In certain embodiments, the method 1000 includes receiving 1004 a state transition report based on the state transition configuration.

In one embodiment, the state transition configuration includes at least one state transition condition, and the at least one state transition condition includes a first trigger that initiates transition to a ground state and a second trigger that initiates transition to an airborne state. In a further embodiment, the at least one state transition condition includes an altitude of the aerial vehicle passing a threshold altitude, a serving cellular network reference signal received power passing a threshold serving cellular network reference signal received power, a neighboring cellular network reference signal received power passing a threshold neighboring cellular network reference signal received power, an average of neighboring cellular network reference signal received powers passing a threshold average reference signal received power, a number of neighboring cellular networks passing a threshold number of neighboring cellular networks, or some combination thereof.

In certain embodiments, the first trigger that initiates transition to the ground state is selected from the group including: an altitude of the aerial vehicle being less than a threshold altitude and a horizontal velocity of the aerial vehicle being less than a threshold horizontal velocity; a number of neighboring cellular networks having a reference signal received power greater than a threshold reference signal received power being less than a threshold number; and the altitude of the aerial vehicle being less than the threshold altitude and the number of neighboring cellular networks having a reference signal received power greater than the threshold reference signal received power being less than the threshold number.

In various embodiments, the second trigger that initiates transition to the airborne state is selected from the group including: an altitude of the aerial vehicle being greater than a threshold altitude and a horizontal velocity of the aerial vehicle being greater than a threshold horizontal velocity; a number of neighboring cellular networks having a reference signal received power greater than a threshold reference signal received power being greater than a threshold number; and the altitude of the aerial vehicle being greater than the threshold altitude and the number of neighboring cellular networks having a reference signal received power greater than the threshold reference signal received power being greater than the threshold number.

In some embodiments, the state transition configuration includes at least one conditional handover parameter, and the at least one conditional handover parameter includes a first set of parameters for a ground state and a second set of parameters for an airborne state. In one embodiment, the first set of parameters includes a neighboring cellular network having a reference signal received power better than a serving cellular network by a first offset, the second set of parameters includes the neighboring cellular network having a reference signal received power better than the serving cellular network by a second offset, or some combination thereof. In a further embodiment, the method 1000 includes receiving a response indicating that the state transition configuration is accepted in response to transmitting the state transition configuration. In certain embodiments, the method 1000 includes receiving the state transmission report in response to one or more state transition conditions occurring.

In various embodiments, the state transmission report includes a current state, a measured altitude, a reference signal received power of a serving cellular network, a reference signal received power of a strongest neighboring cellular network, an average reference signal received power of neighboring cellular networks, a measured number of neighboring cellular networks, a measured number of neighboring cellular networks having a reference signal received power greater than a threshold reference signal received power, or some combination thereof. In some embodiments, the method 1000 includes transmitting a state transition command based on the state transition report, and receiving a report indicating completion of the state transition command. In a further embodiment, the method 1000 includes transmitting a radio resource control configuration based on the state transition report, and the radio resource control configuration includes a first handover command for a normal handover and/or a second handover command for a conditional handover.

In certain embodiments, the method 1000 includes transmitting the first handover command based on a state of the aerial vehicle. In various embodiments, the method 1000 includes transmitting the second handover command based on a state of the aerial vehicle, wherein the second handover command includes a trigger condition. In some embodiments, the method 1000 includes: transmitting a handover procedure in response to the receiver receiving the state transition report; in response to execution of the handover procedure failing, receiving a radio link failure report including state information of the aerial vehicle; transmitting an indication indicating receipt of the radio link failure report; and transmitting a handover report.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving, at an aerial vehicle, a state transition configuration corresponding to the aerial vehicle, wherein the state transition configuration comprises at least one state transition condition that triggers transition between a ground state and an airborne state, the ground state and the airborne state have different radio configurations corresponding to interface control, mobility aspect, or a combination thereof, the ground state configures the aerial vehicle with parameters corresponding to a non-aerial vehicle, and the airborne state configures the aerial vehicle with parameters to reduce interference resulting from being airborne;
detecting, at the aerial vehicle, the at least one state transition condition;
transitioning, at the aerial vehicle, between the ground state and the airborne state in response to detecting the at least one state transition condition; and
transmitting, from the aerial vehicle, a state transition report based on the state transition configuration in response to transitioning between the ground state and the airborne state.

2. The method of claim 1, wherein the state transition configuration comprises at least one state transition condition, and the at least one state transition condition comprises a first trigger that initiates transition to the ground state and a second trigger that initiates transition to the airborne state.

3. The method of claim 2, wherein the at least one state transition condition comprises an altitude of the aerial vehicle passing a threshold altitude, a serving cellular network reference signal received power passing a threshold serving cellular network reference signal received power, a neighboring cellular network reference signal received power passing a threshold neighboring cellular network reference signal received power, an average of neighboring cellular network reference signal received powers passing a threshold average reference signal received power, a number of neighboring cellular networks passing a threshold number of neighboring cellular networks, or some combination thereof.

4. The method of claim 2, wherein the first trigger that initiates transition to the ground state is selected from the group comprising:
an altitude of the aerial vehicle being less than a threshold altitude and a horizontal velocity of the aerial vehicle being less than a threshold horizontal velocity;
a number of neighboring cellular networks having a reference signal received power greater than a threshold reference signal received power being less than a threshold number; and
the altitude of the aerial vehicle being less than the threshold altitude and the number of neighboring cellular networks having a reference signal received power greater than the threshold reference signal received power being less than the threshold number.

5. The method of claim 2, wherein the second trigger that initiates transition to the airborne state is selected from the group comprising:
an altitude of the aerial vehicle being greater than a threshold altitude and a horizontal velocity of the aerial vehicle being greater than a threshold horizontal velocity;
a number of neighboring cellular networks having a reference signal received power greater than a threshold reference signal received power being greater than a threshold number; and the altitude of the aerial vehicle being greater than the threshold altitude and the number of neighboring cellular networks having a reference signal received power greater than the threshold reference signal received power being greater than the threshold number.

6. The method of claim 1, wherein the state transition configuration comprises at least one conditional handover parameter, and the at least one conditional handover parameter comprises a first set of parameters for the ground state and a second set of parameters for the airborne state.

7. The method of claim 6, wherein the first set of parameters comprises a neighboring cellular network having a reference signal received power better than a serving cellular network by a first offset, the second set of parameters comprises the neighboring cellular network having a reference signal received power better than the serving cellular network by a second offset, or some combination thereof.

8. The method of claim 1, further comprising transmitting a response indicating that the state transition configuration is accepted in response to receiving the state transition configuration.

9. The method of claim 1, further comprising:
determining whether one or more state transition conditions of the state transition configuration occur; and
transmitting the state transmission report in response to the one or more state transition conditions occurring.

10. The method of claim 1, wherein the state transmission report comprises a current state, a measured altitude, a reference signal received power of a serving cellular network, a reference signal received power of a strongest neighboring cellular network, an average reference signal received power of neighboring cellular networks, a measured number of neighboring cellular networks, a measured number of neighboring cellular networks having a reference signal received power greater than a threshold reference signal received power, or some combination thereof.

11. The method of claim 1, further comprising:
receiving a state transition command based on the state transition report; and
transmitting a report indicating completion of the state transition command.

12. The method of claim 1, further comprising receiving a radio resource control configuration based on the state transition report, wherein the radio resource control configuration comprises a first handover command for a normal handover, a second handover command for a conditional handover, or a combination thereof.

13. The method of claim 12, further comprising:
receiving the first handover command based on a state of the aerial vehicle;
in response to receiving the first handover command, performing a handover procedure; and
accessing a target base unit.

14. The method of claim 12, further comprising:
receiving the second handover command based on a state of the aerial vehicle, wherein the second handover command comprises a trigger condition;
in response to receiving the second handover command, determining whether the trigger condition is triggered based on the state of the aerial vehicle;
in response to the trigger condition being triggered, performing a handover procedure; and
accessing a target base unit.

15. The method of claim 1, further comprising:
receiving a handover procedure in response to transmitting the state transition report;
in response to execution of the handover procedure failing, transmitting a radio link failure report comprising state information of the aerial vehicle;
receiving an indication indicating that a base unit received the radio link failure report; and
receiving a handover report from the base unit.

16. The method of claim 1, further comprising transmitting a measurement report based on a measurement.

17. The method of claim 16, further comprising performing the measurement using a measurement configuration, wherein the measurement configuration comprises:
prior to the expiration of a timer, completing the measurement upon detection of a cell meeting predetermined criteria; and
upon expiration of the timer, measuring all detected cells.

18. The method of claim 16, further comprising performing the measurement using a measurement configuration, wherein the measurement configuration comprises a maximum number of cells for which measurements are reported in the measurement report.

19. An apparatus comprising an aerial vehicle, the apparatus further comprising:
a receiver that receives a state transition configuration corresponding to the aerial vehicle, wherein the state transition configuration comprises at least one state transition condition that triggers transition between a ground state and an airborne state, the ground state and the airborne state have different radio configurations corresponding to interface control, mobility aspect, or a combination thereof, the ground state configures the aerial vehicle with parameters corresponding to a non-aerial vehicle, and the airborne state configures the aerial vehicle with parameters to reduce interference resulting from being airborne;
a processor that:
detects the at least one state transition condition; and
transitions between the ground state and the airborne state in response to detecting the at least one state transition condition; and
a transmitter that transmits a state transition report based on the state transition configuration in response to transitioning between the ground state and the airborne state.

20. A method comprising:
transmitting a state transition configuration corresponding to an aerial vehicle, wherein the state transition configuration comprises at least one state transition condition that triggers transition between a ground state and an airborne state, the ground state and the airborne state have different radio configurations corresponding to interface control, mobility aspect, or a combination thereof, the ground state configures the aerial vehicle with parameters corresponding to a non-aerial vehicle, and the airborne state configures the aerial vehicle with parameters to reduce interference resulting from being airborne; and
receiving a state transition report based on the state transition configuration in response to the aerial vehicle transitioning between the ground state and the airborne state as a result of the aerial vehicle detecting the at least one state transition condition.

21. An apparatus comprising:
a transmitter that transmits a state transition configuration corresponding to an aerial vehicle, wherein the state transition configuration comprises at least one state transition condition that triggers transition between a ground state and an airborne state, the ground state and the airborne state have different radio configurations corresponding to interface control, mobility aspect, or a combination thereof, the ground state configures the aerial vehicle with parameters corresponding to a non-aerial vehicle, and the airborne state configures the aerial vehicle with parameters to reduce interference resulting from being airborne; and a receiver that receives a state transition report based on the state transition configuration in response to the aerial vehicle transitioning between the ground state and the airborne state as a result of the aerial vehicle detecting the at least one state transition condition.

* * * * *